(12) United States Patent
Chu et al.

(10) Patent No.: US 11,330,084 B2
(45) Date of Patent: May 10, 2022

(54) SIGNALING OF WIRELESS STATION CAPABILITIES

(71) Applicant: NXP USA, Inc., Austin, TX (US)

(72) Inventors: Liwen Chu, San Ramon, CA (US);
Hongyuan Zhang, Fremont, CA (US);
Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/568,287

(22) Filed: Sep. 12, 2019

(65) Prior Publication Data

US 2020/0084302 A1 Mar. 12, 2020

Related U.S. Application Data

(60) Provisional application No. 62/799,617, filed on Jan. 31, 2019, provisional application No. 62/777,651,
(Continued)

(51) Int. Cl.
| | |
|---|---|
| *H04L 29/06* | (2006.01) |
| *H04W 80/02* | (2009.01) |
| *H04W 84/12* | (2009.01) |
| *H04W 88/06* | (2009.01) |
| *H04W 4/40* | (2018.01) |

(Continued)

(52) U.S. Cl.
CPC ............... *H04L 69/18* (2013.01); *H04W 4/40* (2018.02); *H04W 80/02* (2013.01); *H04W 84/12* (2013.01); *H04W 84/18* (2013.01); *H04W 88/06* (2013.01)

(58) Field of Classification Search
CPC ......... H04W 4/40–48; H04W 4/70–80; H04W 28/16–24; H04W 88/06; H04W 69/18
See application file for complete search history.

(56) References Cited

U.S. PATENT DOCUMENTS

2016/0127948 A1   5/2016 Azizi et al.
2017/0201956 A1*  7/2017 Huang .............. H04W 74/006
(Continued)

OTHER PUBLICATIONS

IEEE Standard 802.11p, "IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments", pp. 1-51, Jul. 2010.
(Continued)

*Primary Examiner* — Marcus Smith (57) ABSTRACT

Communication apparatus includes a transceiver configured to transmit and receive signals over a wireless channel in accordance with both a first communication protocol and a second communication protocol, the second communication protocol being backward-compatible with the first communication protocol. The transceiver is configured to provide capabilities that are supported by the second communication protocol but are not supported by the first communication protocol. A communication controller is configured to generate data frames for transmission by the transceiver. The date frames include frame headers that are compatible with the first communication protocol while including, in a specified field of the frame headers, a predefined value indicating that the apparatus is capable of communicating in accordance with the second communication protocol.

12 Claims, 7 Drawing Sheets

Related U.S. Application Data filed on Dec. 10, 2018, provisional application No. 62/730,362, filed on Sep. 12, 2018.

(51) Int. Cl.
*H04L 69/18* (2022.01)
*H04W 84/18* (2009.01)

(56) References Cited

U.S. PATENT DOCUMENTS

| | | | |
|---|---|---|---|
| 2017/0257835 | A1 | 9/2017 | Wu et al. |
| 2019/0222680 | A1 | 7/2019 | Chu et al. |
| 2019/0223253 | A1 | 7/2019 | Sakamoto et al. |
| 2019/0280919 | A1* | 9/2019 | Sadeghi ............. H04L 41/0803 |
| 2019/0288894 | A1* | 9/2019 | Boudreau ............. H04W 16/14 |
| 2019/0297146 | A1* | 9/2019 | Noh ........................ H04L 67/12 |
| 2019/0319840 | A1* | 10/2019 | Cheng ................... H04W 64/00 |
| 2019/0342796 | A1* | 11/2019 | Lepp ..................... H04W 28/20 |
| 2019/0373639 | A1* | 12/2019 | Elliott .................... H04L 69/08 |

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.

IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, Dec. 2013.

IEEE Standard 802.11a (2003), "IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band", pp. 1-92, Jun. 2003.

IEEE Std 802.11g™, "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band", pp. 1-78, Jun. 27, 2003.

IEEE 802.11b-1999/Cor Jan. 2001—IEEE Standard for Information Technology—Telecommunications and Information Exchange Between Systems—Local and Metropolitan Networks—Specific Requirements—Part 11: Wireless LAN Medium Access Control (MAC) and Physical Layer (PHY) Specifications: Higher Speed Physical Layer (PHY) Extension in the 2.4 GHz Band—Corrigendum 1, pp. 1-23, 2001.

Cao et al., U.S. Appl. No. 16/578,478, filed Sep. 23, 2019.

Naik et al., "IEEE 802.11 bd & 5G NR V2X: Evolution of Radio Access Technologies for V2X Communications", pp. 1-12, Mar. 26, 2019.

Cao et al., U.S. Appl. No. 16/561,047, filed Sep. 5, 2019.

International Application # PCT/IB2019/057476 dated Nov. 25, 2019.

\* cited by examiner

SIGNALING OF WIRELESS STATION CAPABILITIES

CROSS-REFERENCE TO RELATED APPLICATION

This application claims the benefit of U.S. Provisional Patent Application 62/730,362, filed Sep. 12, 2018; U.S. Provisional Patent Application 62/777,651, filed Dec. 10, 2018; and U.S. Provisional Patent Application 62/799,617, filed Jan. 31, 2019. All of these related applications are incorporated herein by reference.

FIELD OF THE INVENTION

The present invention relates generally to communication networks, and particularly to methods and apparatus for data communications in a vehicular environment.

BACKGROUND

Data communications to and from traveling vehicles have attracted increasing attention in the communication and automotive industries. This attention has led to the development of the IEEE 802.11p amendment to the 802.11 wireless local area network (WLAN) family of standards. IEEE 802.11p was defined to add wireless access in vehicular environments (WAVE), and specifies enhancements to the basic 802.11 standard that are useful in supporting Intelligent Transportation System (ITS) applications. The specific features of the 802.11p standard are described in IEEE Standard 802.11p™-2010, published by the IEEE Computer Society (New York, N.Y., 2010).

Advances in wireless technologies since the adoption of the 802.11p standard have led to the need for updates to the standard, for example for higher throughput applications, better reliability and efficiency, and extended communication range. For this purpose, the Next Generation V2X Study Group (NGV SG) was established in 2018 to develop the IEEE 802.11bd specification. (The term "V2X" refers to "vehicle-to-everything" communication, in which information is passed between a vehicle and any other entity that may affect the vehicle, including other vehicles.) The 802.11bd specification will support enhanced V2X technologies, while maintaining backward compatibility with 802.11p.

SUMMARY

Embodiments of the present invention that are described hereinbelow provide improved methods and apparatus for communications, particularly in vehicular environments.

There is therefore provided, in accordance with an embodiment of the invention, communication apparatus, including a transceiver configured to transmit and receive signals over a wireless channel in accordance with both a first communication protocol and a second communication protocol, the second communication protocol being backward-compatible with the first communication protocol. The transceiver is configured to provide capabilities that are supported by the second communication protocol but are not supported by the first communication protocol. A communication controller is configured to generate data frames for transmission by the transceiver. The date frames include frame headers that are compatible with the first communication protocol while including, in a specified field of the frame headers, a predefined value indicating that the apparatus is capable of communicating in accordance with the second communication protocol.

In some embodiments, the communication controller is configured to generate a medium access control (MAC) header of the data frames, which includes the specified field as a part of the MAC header. In a disclosed embodiment, the specified field is a duration/ID field in the MAC header, wherein the duration/ID field is used in signaling a duration value.

Additionally or alternatively, the data frames generated by the communication controller that include the predefined value in the specified field of the frame headers include broadcast frames, to be received and processed by all of the other stations in a neighborhood of the apparatus.

In some embodiments, the communication controller is configured to process data frames received by the transceiver from a wireless station, and in response to detecting that the specified field in a received data frame contains the predefined value, to respond to the wireless station by transmitting a data frame in accordance with the second communication protocol.

In a disclosed embodiment, the first communication protocol is an IEEE 802.11p protocol, and the second protocol in an IEEE 802.11bd protocol.

There is also provided, in accordance with an embodiment of the invention, communication apparatus, including a transceiver configured to transmit and receive signals over a wireless channel in accordance with both a first communication protocol and a second communication protocol, the second communication protocol being backward-compatible with the first communication protocol. The transceiver is configured to provide capabilities that are supported by the second communication protocol but are not supported by the first communication protocol. A communication controller is configured to process data frames received by the transceiver from a wireless station, and in response to detecting that a header of a received data frame that is compliant with the first communication protocol contains a predefined value in a specified field of the header, to respond to the wireless station by transmitting a data frame formatted in accordance with the second communication protocol.

In some embodiments, the communication controller is configured to process the data frames received by the transceiver from multiple wireless stations in a neighborhood of the apparatus, and upon detecting that at least one of the received data frames does not contain the predefined value in the specified field of the header, to transmit further data frames in accordance with the first communication protocol. In a disclosed apparatus, the further data frames include broadcast frames, to be received and processed by all of the other stations in a neighborhood of the apparatus, and the communication controller is configured to transmit a broadcast frame in accordance with the second communication protocol only when all of the data frames received by the transceiver within a specified time interval prior to the broadcast frame contain the predefined value in the specified field.

There is additionally provided, in accordance with an embodiment of the invention, a communication apparatus, including a transceiver configured to transmit and receive signals over a wireless channel in accordance with both a first communication protocol and a second communication protocol, the second communication protocol being backward-compatible with the first communication protocol. The transceiver is configured to provide capabilities that are supported by the second communication protocol but are not supported by the first communication protocol. A communication controller is configured to generate data frames for transmission by the transceiver, including a first broadcast frame that is compatible with the first communication protocol, followed immediately by a second broadcast frame that is compatible with the second communication protocol and indicates that the apparatus is capable of communicating in accordance with the second communication protocol.

In a disclosed embodiment, the first and second broadcast frames are separated in time by a Short Interframe Space (SIFS).

There is further provided, in accordance with an embodiment of the invention, a method for communication, which includes providing a transceiver that is capable of transmitting and receiving signals over a wireless channel in accordance with both a first communication protocol and a second communication protocol, the second communication protocol being backward-compatible with the first communication protocol. The transceiver has capabilities that are supported by the second communication protocol but are not supported by the first communication protocol. The capabilities of the transceiver are signaled by transmitting from the transceiver a data frame including a frame header that is compatible with the first communication protocol while including, in a specified field of the frame headers, a predefined value indicating that the transceiver is capable of communicating in accordance with the second communication protocol.

There is moreover provided, in accordance with an embodiment of the invention, a method for communication, which includes providing a transceiver that is capable of transmitting and receiving signals over a wireless channel in accordance with both a first communication protocol and a second communication protocol, the second communication protocol being backward-compatible with the first communication protocol. The transceiver has capabilities that are supported by the second communication protocol but are not supported by the first communication protocol. A data frame received by the transceiver from a wireless station is processed so as to detect that a header of the received data frame that is compliant with the first communication protocol contains a predefined value in a specified field of the header. Upon detecting that the header contains the predefined value, a data frame in accordance with the second communication protocol is transmitted so as to respond to the wireless station.

There is furthermore provided, in accordance with an embodiment of the invention, a method for communication, which includes providing a transceiver that is capable of transmitting and receiving signals over a wireless channel in accordance with both a first communication protocol and a second communication protocol, the second communication protocol being backward-compatible with the first communication protocol. The transceiver has capabilities that are supported by the second communication protocol but are not supported by the first communication protocol. The capabilities of the transceiver by transmitting from the transceiver a first broadcast frame that is compatible with the first communication protocol, followed immediately by a second broadcast frame that is compatible with the second communication protocol and indicates that the transceiver is capable of communicating in accordance with the second communication protocol.

The present invention will be more fully understood from the following detailed description of the embodiments thereof, taken together with the drawings in which:

DETAILED DESCRIPTION OF EMBODIMENTS

As advanced wireless communication stations are deployed, such as NGV stations, such stations will often find themselves in environments that contain both other NGV stations and legacy stations, and specifically legacy stations operating in accordance with the 802.11p standard noted above. For this reason, NGV protocols, such as the 802.11bd standard, are designed to be backward-compatible with legacy standards. NGV stations will be able to take advantage of the advanced capabilities that NGV standards have to offer only after ascertaining that their neighboring stations are also NGV stations and are thus capable of supporting NGV communications.

In V2X environments, however, it can be difficult for a station to ascertain the capabilities of its neighbors. In contrast to wireless local area networks (WLANs), in which stations associate with the basic service set (BSS) of a fixed access point and remain in its vicinity for some time, in the V2X environment there is no such association. Rather, stations contact their neighboring peer stations by transmission of broadcast frames or unicast frames, without BSS association. Vehicle-mounted stations can be in constant movement, so that the identities—and capabilities—of the neighboring stations may change rapidly. There is therefore a need to enable stations in a vehicular environment to determine rapidly whether their neighbors are legacy or NGV stations, and to do so while communicating in accordance with the legacy (802.11p) protocol so as to ensure that all neighboring stations are able to receive and decode the transmissions.

Embodiments of the present invention that are described herein address this need by maintaining the legacy format of certain communication frames transmitted by NGV stations, while inserting a predefined value in a particular, specified field of the frame headers to indicate that the transmitting station is capable of communicating in accordance with the NGV protocol. Upon receiving a data frame of this sort and detecting that the specified field contains the predefined value, NGV stations will respond by transmitting a data frame indicating their compliance with the NGV protocol. Legacy stations, on the other hand, will not associate any particular meaning with the predefined value of the field in question, and thus will respond by transmitting ordinary legacy data frames. Upon ascertaining in this manner that its neighbors are NGV-compliant, an NGV station can then respond and communicate using the NGV protocol, without concern that a neighboring legacy station will be unable to decode the communications.

The embodiments that are described herein refer specifically, for the sake of concreteness and clarity, to V2X standards, and particularly to NGV and the emerging 802.11bd standard. The principles of the present invention may similarly be applied, however, in other environments in which advanced and legacy communication devices coexist, while maintaining backward-compatibility between the advanced communication protocol used by the advanced devices and the legacy protocol used by the legacy devices. All such alternative applications and implementations are considered to be within the scope of the present invention.

Figure 1:
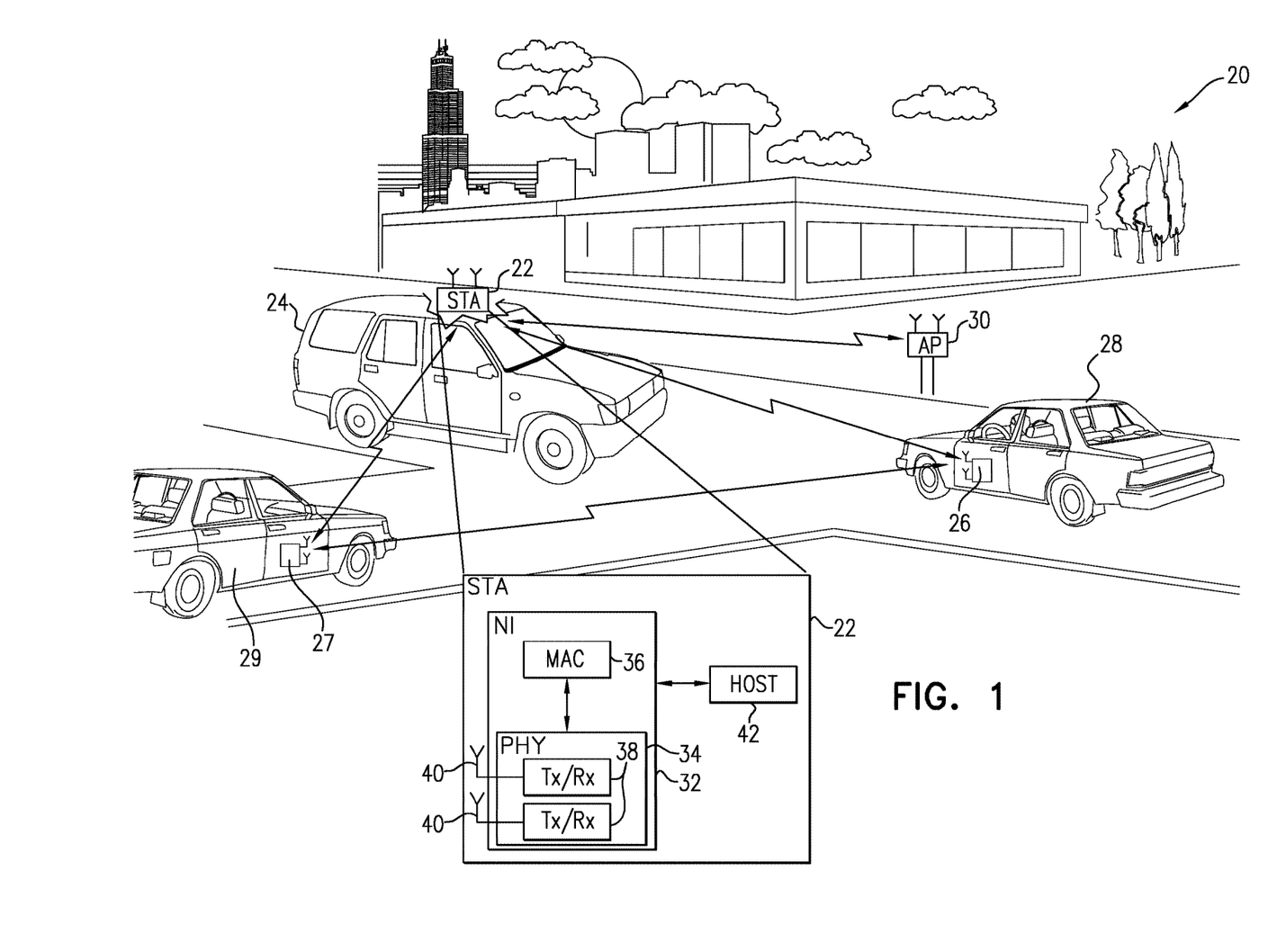
FIG. 1 is a schematic, pictorial illustration of a communication system, in accordance with an embodiment of the invention.

FIG. 1 is a schematic, pictorial illustration of a communication system 20, in accordance with an embodiment of the invention. In the pictured scenario, a communication station (STA) 22 in a moving vehicle 24 communicates with one or more target receivers. For example, STA 22 may communicate with peer STAs 26 and 27 in other vehicles 28 and 29, and/or with fixed roadside infrastructure, such as an access point (AP) 30 (which is also considered a STA in association-less protocols such as IEEE 802.11p). Although the description that follows relates specifically to transmissions of data from STA 22 to a target receiver, in practice the communications in system 20 are bidirectional, meaning that STAs 26 and 27 and AP 30 may transmit data to STA 22 and one to another using the same methods and principles.

As shown in the inset in FIG. 1, STA 22 comprises a network interface (NI) 32, which comprises physical layer (PHY) and medium access control (MAC) interfaces 34 and 36, in accordance with the IEEE 802.11 specifications. PHY interface 34 comprises one or more radio transceivers 38, which are connected to antennas 40. In the pictured embodiment, PHY interface 34 comprises two such transceivers, each with its own antenna. Alternatively, larger or smaller numbers of transceivers and antennas may be used, with one or more antennas connected to each transceiver. The internal construction of STAs 26 and 27 and of AP 30 may be similar to that of STA 22. Typically, the components of PHY and MAC interfaces 34 and 36 are implemented in dedicated or programmable hardware logic circuits, on a single integrated circuit chip or a set of two or more chips.

Assuming STA 22 to be NGV-compatible, transceivers 38 in STA 22 are capable of transmitting and receiving signals over wireless channels in accordance with the requirements of both the IEEE 802.11p and IEEE 802.11bd standards. (As noted earlier, IEEE 802.11bd is backward-compatible with IEEE 802.11p.) Transceivers 38 thus provide capabilities that are supported by IEEE 802.11bd, such as extended throughput and extended range, but are not supported by IEEE 802.11p.

A host processor 42 passes data to network interface 32 for transmission over the air to target receivers, and receives incoming data from network interface 32. Host processor 42 typically comprises a programmable device, such as a microprocessor, microcontroller, and/or programmable gate array, along with a suitable memory and other resources (not shown), and is programmed in software or firmware to carry out various control and communication functions in STA 22. The software may be stored in tangible, non-transitory computer-readable media, such as a suitable RAM or ROM memory. Host processor 42 may be implemented together with the elements of network interface 32 in a single system-on-chip (SoC), or as a separate chip or chip set.

The components of STA 22 that are involved in encoding, decoding and framing data transmitted and received by transceivers 38, including setting parameters used in such operations, are referred to collectively herein as "control logic." The control logic typically includes both host processor 42 and components of network interface 32. The parameters that are set by the control logic, in the embodiments that are described herein, include the values of header fields that are used to signal the capabilities of STA 22, such as the ability of STA 22 to support an NGV protocol. Thus, in some embodiments, MAC interface 36 generates data frames for transmission by transceivers 38 that include frame headers compatible with IEEE 802.11p, while including, in a specified field of the frame headers, a predefined value indicating that STA 22 is also capable of communicating in accordance with IEEE 802.11bd.

When host processor 42 conveys outgoing data to network interface 32, MAC interface 36 encapsulates the outgoing data in MAC-layer data frames, referred to as MAC protocol data units (MPDUs). MAC interface 36 passes these MPDUs to PHY interface 34, which encapsulates them in physical-layer data frames (PPDUs, also referred to as packets). The data are encoded in each PPDU as a sequence of data symbols in accordance with a frequency-domain multiplexing scheme extending over a range of sub-carrier tones, for example the OFDM scheme specified by IEEE 802.11p, possibly with enhancements provided by IEEE 802.11bd.

Figure 2:
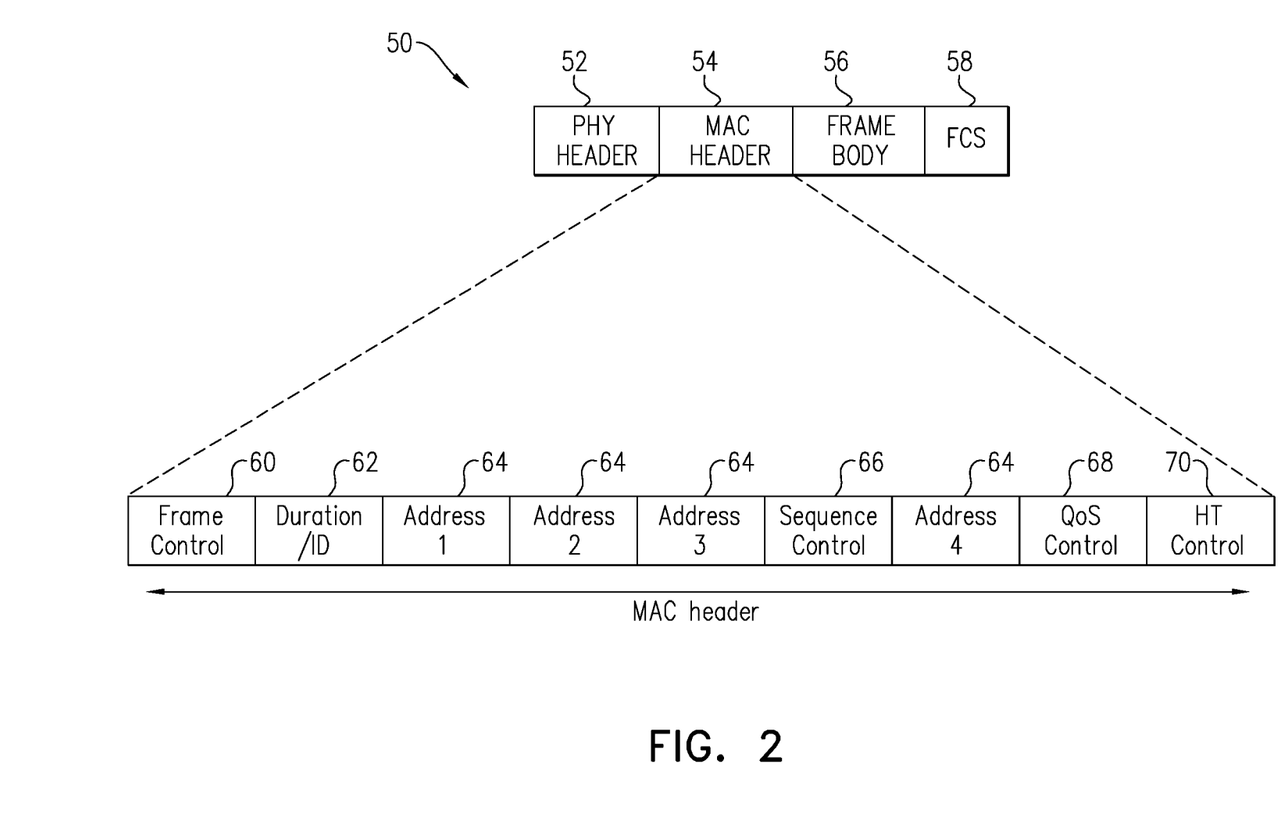
FIG. 2 is a block diagram that schematically illustrates a data frame transmitted over a wireless channel, in accordance with an embodiment of the invention.

FIG. 2 is a block diagram that schematically illustrates a data frame 50 transmitted over a wireless channel, in accordance with an embodiment of the invention. The format of frame 50 is compatible with the 802.11p standard, and includes a PHY header 52 and a MAC header 54, followed by a frame body 56, which contains the data payload (possibly including upper-layer protocol headers), and a frame check sequence (FCS) 58. The arrangement of the fields of headers 52 and 54 is compatible with the IEEE 802.11p protocol. Certain fields in the headers, however, can have predefined values indicating advanced capabilities of the STA transmitting data frame 50, for example values indicating that the STA has NGV communication capabilities, such as those provided by the IEEE 802.11bd standard.

As shown in the insert in FIG. 2, MAC header 54 comprises a frame control field 60, followed by a duration/ID field 62. Special values in field 60 and/or field 62 can be used to signal the NGV capabilities of the STA transmitting the frame; specific implementations using duration/ID field 62 are described in detail hereinbelow. These initial fields in MAC header 54 are followed by one or more address fields 64, along with a sequence control field 66, which could also contain a value to signal NGV capabilities. These fields are followed by a quality of service (QoS) control field 68 and a high throughput (HT) control field 70.

In other embodiments, certain fields in PHY header 52 or in frame body 56 could be used to signal NGV capabilities. For example, a Dedicated Short Range Communications (DSRC) protocol header in frame body 56 can be used to indicate that although data frame 50 is 802.11p-compatible, it has been transmitted by a STA with NGV capabilities. Alternatively, an Extended Capabilities element may be incorporated in a Timing Advertisement frame or in another Action no-Ack frame for similar purposes.

Figure 3:
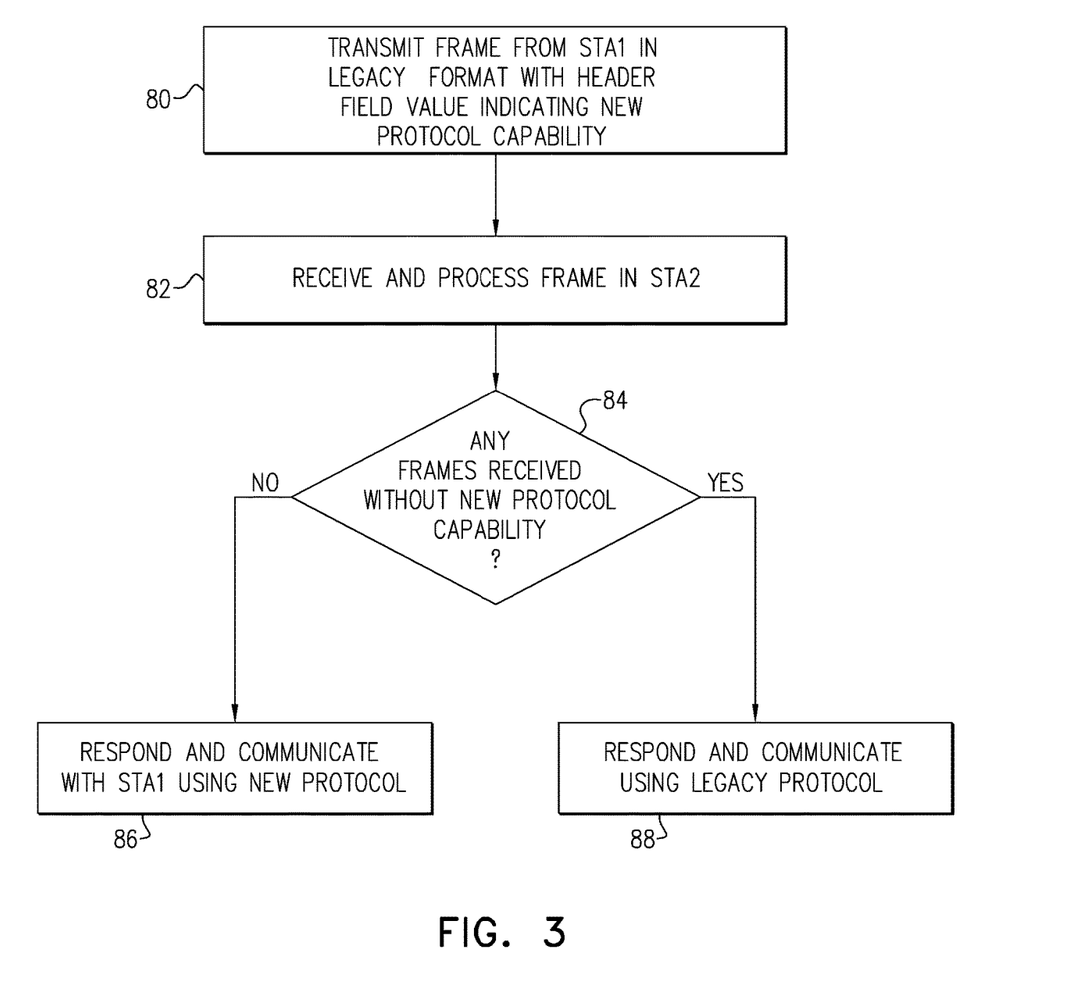
FIG. 3 is a flow chart that schematically illustrates a method for communication, which may be carried out in the system of FIG. 1 using data frames as illustrated in FIG. 2, in accordance with an embodiment of the invention.

FIG. 3 is a flow chart that schematically illustrates a method for communication, in accordance with an embodiment of the invention. The method is described, for the sake of clarity and concreteness, with reference to the elements of system 20, and specifically in relation to how a station in the system, such as STA 22, signals its NGV capabilities and ascertains the NGV capabilities (or lack thereof) of its neighboring stations. Alternatively, the principles of this method may be applied, mutatis mutandis, in other vehicular environments, as well as in other sorts of dynamic settings in which legacy and advanced protocol capabilities co-exist.

A first station in system 20, referred to as STA1 (for example, STA 22 in FIG. 1), initiates the method of FIG. 3 by transmitting a data frame in the legacy format, i.e., in accordance with the IEEE 802.11p protocol in the present example, at a frame transmission step 80. The frame header includes a field, for example duration/ID field 62 in MAC header 54, containing a predefined, special value indicating that STA1 is capable of supporting a newer, more advanced protocol, such as IEEE 802.11bd. In the present embodiment, the frame transmitted at step 80 is a broadcast frame, to be received and processed by all of the other stations in the neighborhood of STA1.

Other stations in the neighborhood of STA1, referred to as STA2 (for example, STA 26 and STA 27, as well as AP 30, in FIG. 1), receive and process the broadcast frame, at a reception step 82. Assuming STA 26 to be a legacy station, for example, without NGV capabilities, STA 26 will note the presence of STA 22 but will ignore the special value inserted by STA 22 in duration/ID field 62 (or whichever other field is specified for this purpose). In subsequent communications with STA 22, STA 26 will simply transmit frames to STA 22 in the manner specified by IEEE 802.11p.

On the other hand, assuming STA 27 to have NGV capabilities, STA 27 will detect that that although headers 52 and 54 of the broadcast data frame that it has received are compliant with IEEE 802.11p, duration/ID field (or some other field) contains the predefined, special value indicating that STA 22 has NGV capabilities. In this case, STA 27 will take note that STA 22 is NGV-compliant. In subsequent communications with STA 22, STA 27 will transmit data frames in accordance with the advanced protocol, for example as specified by IEEE 802.11bd.

Alternatively or additionally, this header-based scheme for signaling protocol capabilities may be applied in unicast frames. For example, if STA 22 transmits a unicast frame to STA 26 with the special value inserted in duration/ID field 62, STA 26 will simply respond with an acknowledgment frame as specified by IEEE 802.11p. STA 22 will then identify STA 26 as a legacy station. At the same time, if STA 27 receives and decodes this unicast frame and acknowledgment, it will be able to identify STA 22 as an NGV-compliant station and STA 26 as a legacy station (but since the unicast frame was not addressed to STA 27, STA 27 will not transmit an acknowledgment frame).

STA 22 processes the data frames received by its transceivers 38 from the wireless stations in its neighborhood, at a response processing step 84. The purpose of this step is to determine whether or not the received frames indicate that the stations that transmitted them have NGV capabilities. When the received frames contain the specified field value indicating that a given station, for example STA 27, is NGV-compliant, STA 22 can then respond and communicate with STA 27 using the IEEE 802.11bd protocol, at a new protocol communication step 86. In this manner, for example, STA 22 and STA 27 will be able to exploit the extended throughput and extended range modes of operation that are offered by the NGV standard.

On the other hand, upon detecting that at least one of the received data frames, for example from STA 26, does not contain the predefined value in the specified field of the header, STA 22 will transmit further data frames to the station in question using the legacy IEEE 802.11p protocol, at a legacy communication step 88. Furthermore, STA 22 will transmit broadcast frames in accordance with the NGV protocol only when all of the neighboring stations have announced that they are NGV-compliant. In other words, STA 22 will transmit NGV broadcast frames only when all the transmissions received within a certain interval prior to the broadcast transmission contain the appropriate value in the specified header field to indicate that the neighboring stations are NGV-compliant.

The interval may be short, for example on the order of seconds, considering that the vehicles in which the stations are deployed may be moving in different directions. Thus, each time an NGV-compliant STA receives a frame from a legacy STA, the NGV-compliant STA may set a "neighbor timer" to a certain threshold, for example 1000 ms. The timer then counts down. If no frame is received from a neighboring legacy station until the timer reaches zero, the NGV-compliant STA assumes that there are no legacy stations remaining in its neighborhood. The NGV-compliant STA can then transmit broadcast frames in NGV PPDUs.

Figure 4:
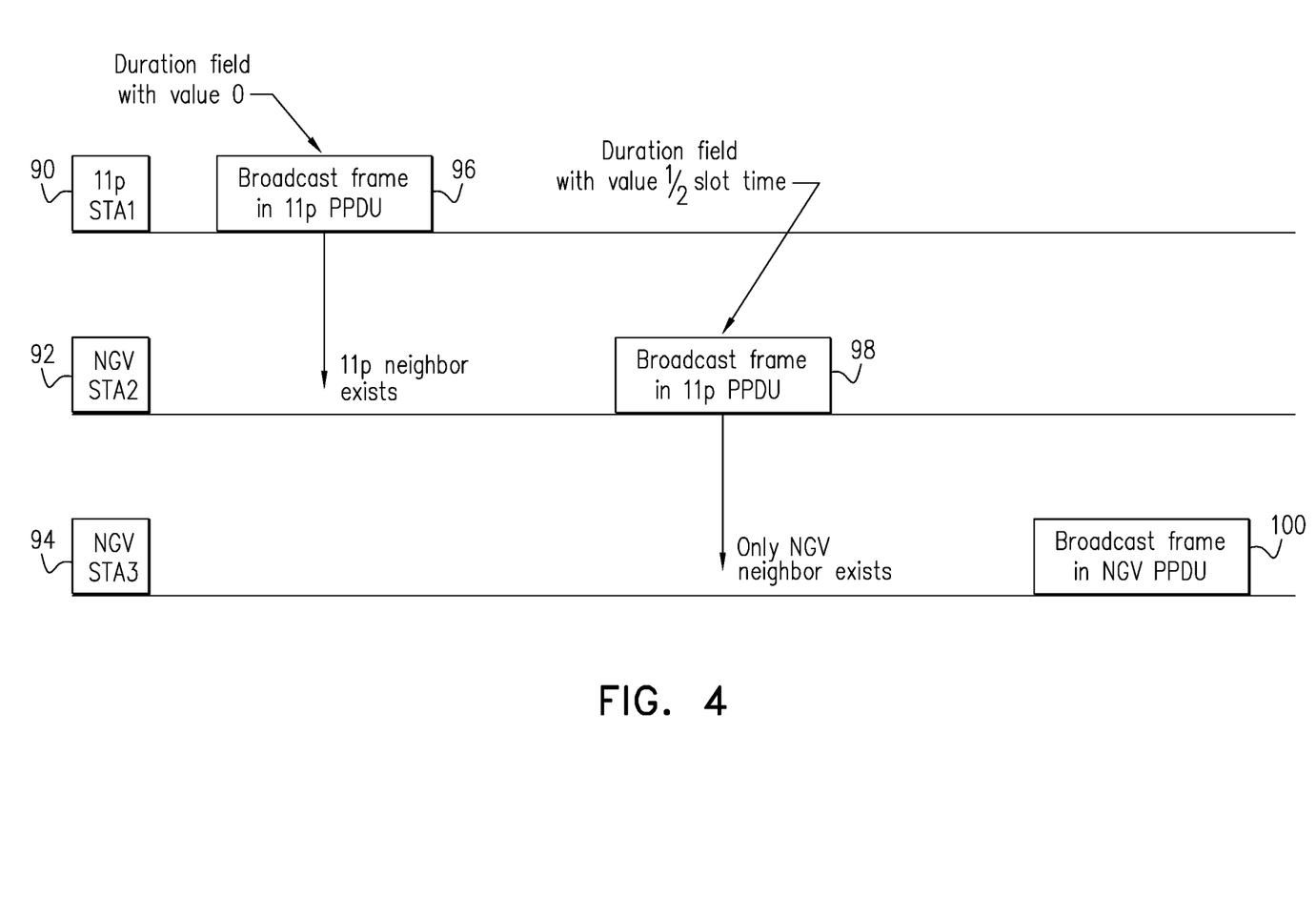
FIGS. 4-7 are communication timing diagrams, which schematically illustrate data frames transmitted among wireless stations, such as the stations in the system of FIG. 1, using data frames as illustrated in FIG. 2, in accordance with an embodiment of the invention.

FIG. 4 is a communication timing diagram, which schematically illustrates data frames 96, 98, 100 that are broadcast among wireless stations 90, 92 and 94, in accordance with an embodiment of the invention. As shown in the figure, station 90 (labeled STA1) is assumed to operate in accordance only with the legacy protocol IEEE 802.11p. Stations 92 and 94 (STA2 and STA3) are assumed to be NGV-compliant. Stations 90, 92 and 94 may be deployed, for example, in the manner shown in FIG. 1 with respect to stations 22, 26 and 27 and described above with reference thereto.

The embodiment shown in FIG. 4 makes use of duration/ID field 62 in MAC header 54 (FIG. 2) to signal the NGV capability of the transmitting station. The duration/ID field is defined in section 9.2.4.2 of the IEEE Draft Standard IEEE P802.11REVmc™/D8.0 (August 2016). In conventional IEEE 802.11 standards, including the 802.11p standard, this field is used for various purposes, including particularly signaling a duration value (in microseconds). Specifically, the duration/ID value for a single frame conventionally represents the time that is required to transmit an acknowledgment of the present frame plus one Short Interframe Space (SIFS) interval, as is known in the art. (If multiple frames are transmitted in a single transmit opportunity, referred to as TXOP, the conventional duration value will be corresponding longer.) A legacy station, such as station 90 in the present example, will compute and insert this duration/ID value in unicast frames that it transmits.

A broadcast frame, which does not require acknowledgment, conventionally has a duration/ID value of zero; and legacy stations will ignore the duration/ID value in responding to it. Thus, when station 90 broadcasts frame 96, it sets the value of duration/ID field 62 in MAC header 54 of this frame to zero. Consequently, upon receiving frame 96, station 92 is able to identify the source of the frame (in this case, the neighboring station 90) as a legacy station, operating in accordance with IEEE 802.11p.

As noted earlier, however, stations with NGV capability, such as station 92, insert a different, predefined value in duration/ID field 62 to signal their capabilities to other NGV-compliant stations. For example, station 92 may insert a duration/ID value of slot time in MAC header 54 of broadcast frame 98, although the overall format of frame 98 complies with the legacy requirements of IEEE 802.11p. (The standard slot time is 13 µs) Alternatively, other predefined values may be used, depending on the requirements of the applicable standard, such as IEEE 802.11bd. Legacy station 90 will ignore this value, as explained above, but station 94 will be able to identify station 92 on this basis as an NGV-compliant station, operating in accordance with IEEE 802.11bd.

Assuming station 91 is in proximity to station 92, but distant from station 90, station 94 will not receive frame 96 (or will receive it at a power level below a minimum detection threshold). In this case, station 94 may verify that there are no legacy stations in its neighborhood. On this basis, station 94 may broadcast frame 100 in an NGV PPDU, with the additional features provided by IEEE 802.11bd, for example.

As noted earlier, although the present examples relate specifically to the use of duration/ID field 62 for purposes of NGV signaling, other fields in MAC header 54 may alternatively be used for this purpose. Furthermore, in alternative embodiments, selected fields in PHY header 52 or in higher-layer protocol headers in frame body 56 may be used.

Figure 5:
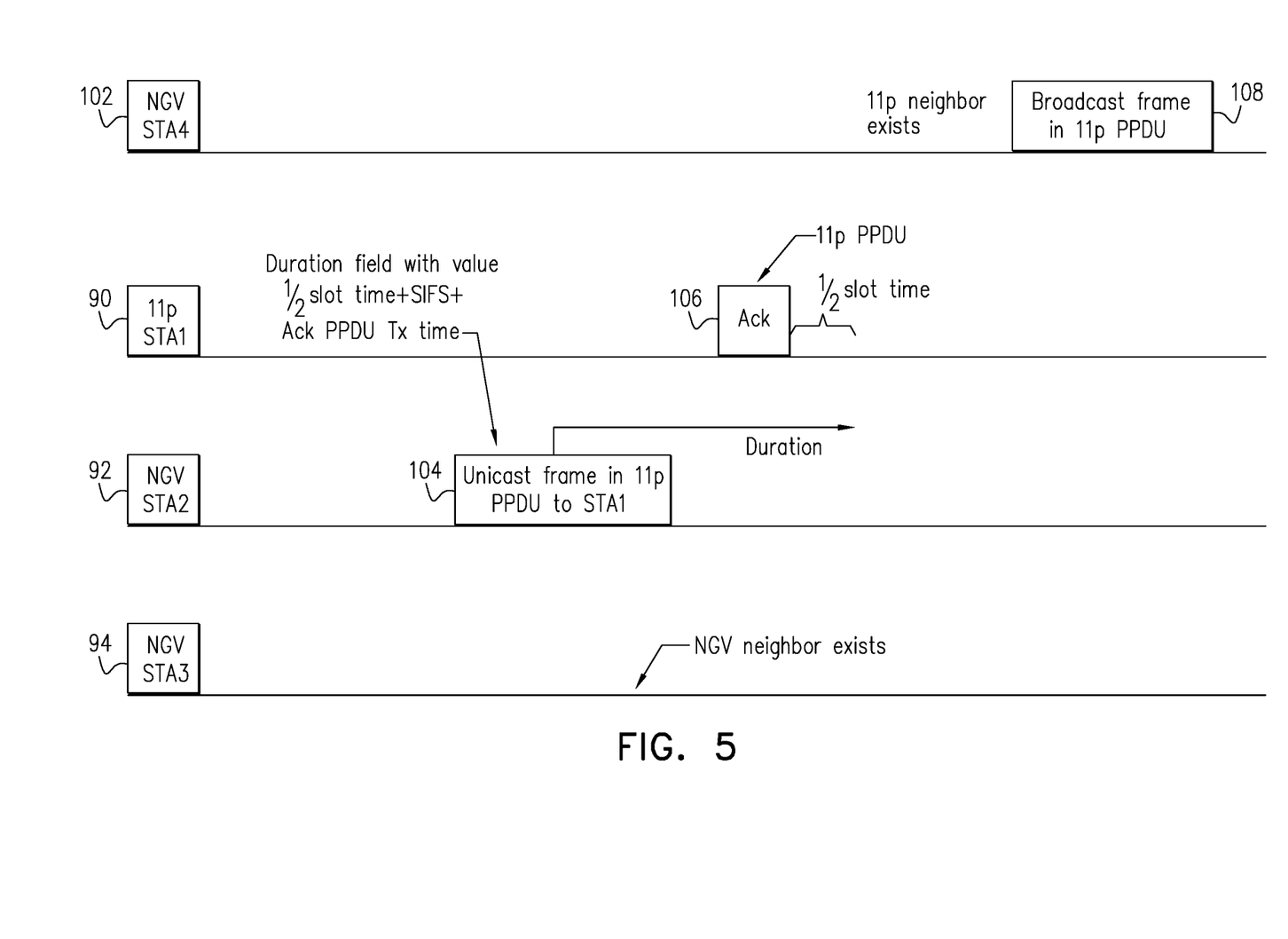

FIG. 5 is a communication timing diagram, which schematically illustrates handling of a data frame 104 that is unicast by NGV-compliant wireless station 92 to legacy station 90, in accordance with an embodiment of the invention. In this embodiment station 92 similarly uses duration/ID field 62 in frame 104 to signal its NGV capability, although again, the format of frame 104 is compliant with IEEE 802.11p. For example, instead of setting field 62 to the conventional value (which would be the time that is required to transmit an acknowledgment plus one SIFS interval), station 92 sets this field to a value equal to the conventional value plus ½ slot time. Even if NGV-compliant station 94 is not the addressee of frame 104, it may receive and decode this frame. Based on the value of duration/ID field 62 in frame 104, station 94 will recognize that station 92 is NGV-compliant.

In response to unicast frame 104, legacy station 90 transmits an acknowledgment frame 106. Notwithstanding the special value of duration/ID field 62 in frame 104, acknowledgment frame 106 terminates at the conventional time, leaving the additional duration of ½ slot time unused. On this basis, both station 92 and other stations, such as an NGV-compliant station 102, will recognize that station 90 is a legacy station, without NGV capability. Therefore, when station 102 transmits a frame that will be received by station 90, such as a broadcast frame 108, it will format the frame in compliance with the legacy 802.11p protocol.

In contrast to station 90, when an NGV-compliant station, such as station 94, receives a unicast frame, such as frame 104, it will transmit an acknowledgment that is timed so as to terminate at the time indicated by the actual value of duration/ID field 62 in frame 104, without leaving additional unused duration. Furthermore, station 94 may itself insert a specified value in duration/ID field 62 of the acknowledgment frame to indicate its own NGV capability. For example, station 94 may set the value of duration/ID field 62 in the acknowledgment frame to be ¼ slot.

Figure 6:
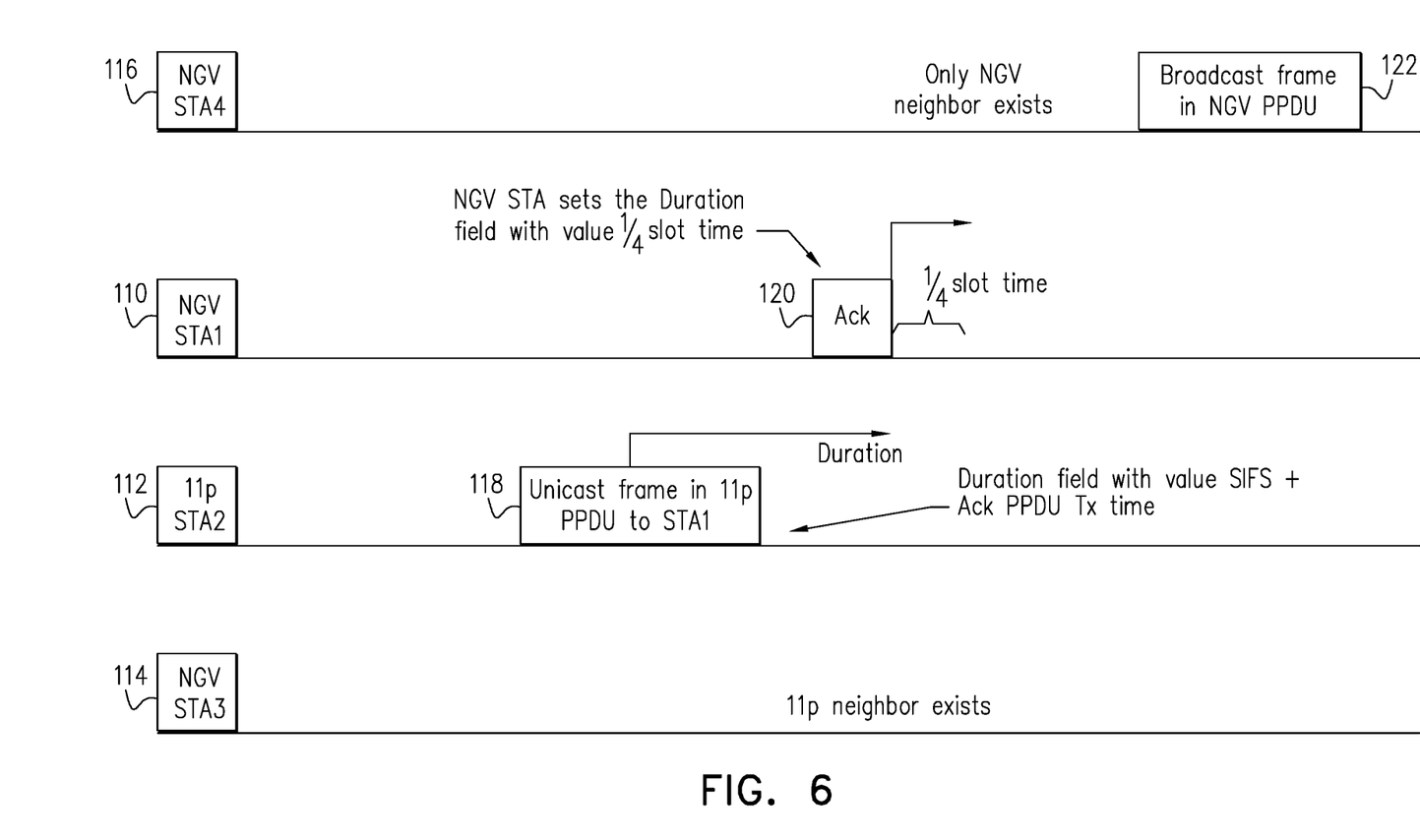

FIG. 6 is a communication timing diagram, which schematically illustrates the use of duration/ID field 62 in an acknowledgment (Ack) frame 120 transmitted by an NGV-compliant station 110 in signaling its NGV capabilities, in accordance with an embodiment of the invention. In this scenario, a legacy station 112 transmits an 802.11p-compliant unicast frame 118 to station 110. Station 112 sets duration/ID field 62 in unicast frame 118 to its conventional value: the time required to transmit an acknowledgment plus one SIFS interval. As in the previous embodiments, a neighboring NGV-compliant station 114 may receive frame 118, read the duration/ID value, and on this basis recognize that the neighboring station 112 is a legacy station.

Upon receiving unicast frame 118, NGV-compliant station 110 transmits an acknowledgment frame 120 at the time indicated by the duration/ID value in frame 118. Thus, legacy station 112 will receive the acknowledgment and consider that its message exchange with station 110 was successful. To signal its NGV capability to other NGV stations, however, station 110 inserts a special, predefined value, for example ¼ slot, into duration/ID field 62 of acknowledgment frame 120. (As noted earlier, other predefined values, rather than ¼ slot, may be used for this purpose.) Legacy station 112 will ignore this value, since it is not required by and has no meaning in the context of the IEEE 802.11p standard.

Other NGV-compliant stations, however, such as a station 116, may receive acknowledgment frame 120 and will then recognize the NGV capability of station 110 on the basis of the value (for example, ¼ slot) of duration/ID field 62 in frame 120. Assuming station 116 does not detect any legacy stations among its own neighbors, station 116 may conclude that all of its neighbors are NGV-compliant, and may thus transmit a broadcast frame 122 in a non-legacy NGV format.

Figure 7:
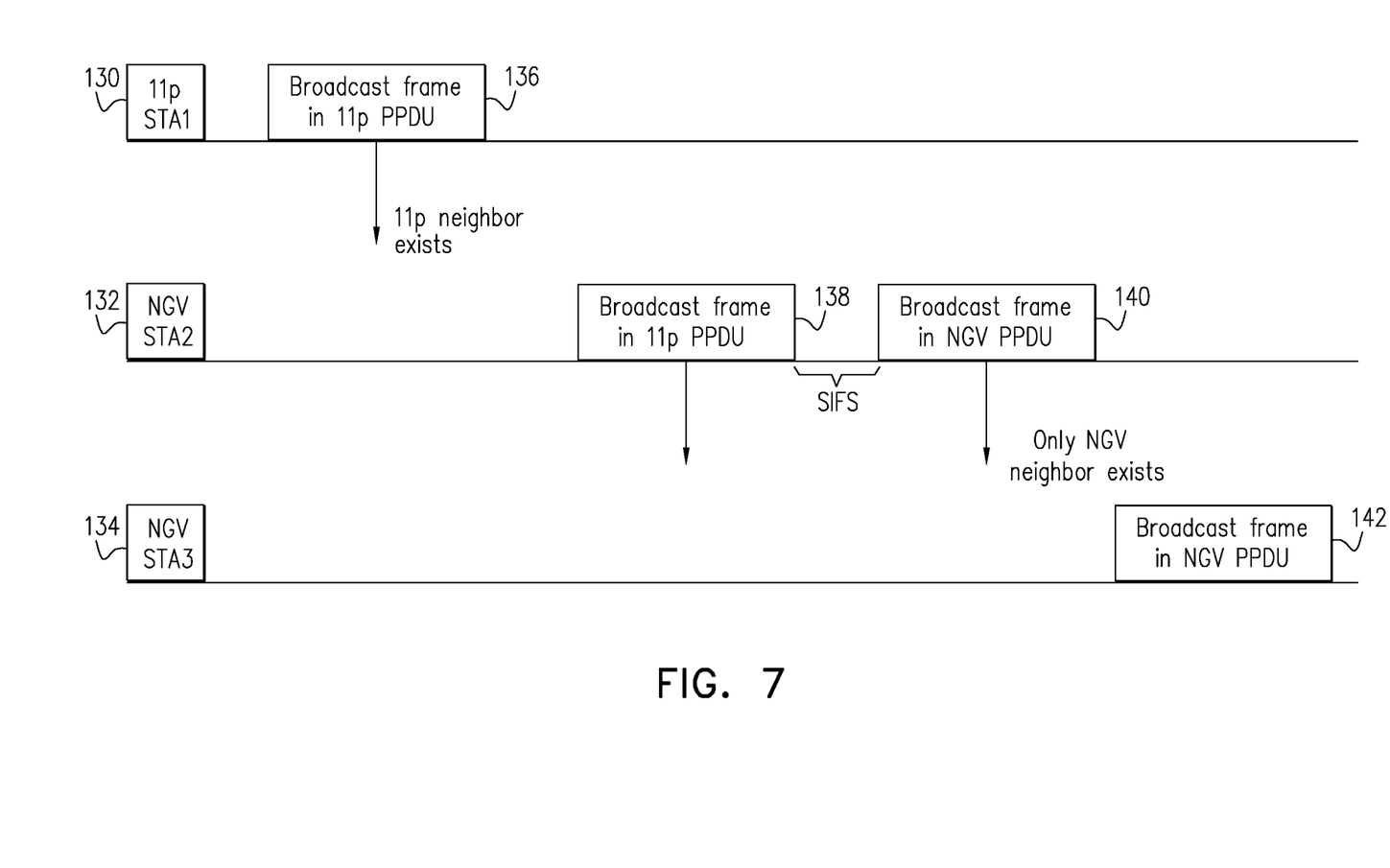

FIG. 7 is a communication timing diagram that schematically illustrates data frames 136, 138, 140 and 142 that are broadcast among wireless stations 130, 132 and 134, in accordance with an alternative embodiment of the invention. In this example, station 130 is assumed to be a legacy station, operating in accordance with IEEE 802.11p, while stations 132 and 134 have NGV capability. In the present embodiment, NGV-compliant stations, operating in an environment that contains legacy stations identify their capabilities by broadcasting a frame in a legacy, 802.11p PPDU, followed immediately by an NGV PPDU (separated by a SIFS interval) to indicate that the station is capable of communicating in accordance with the NGV protocol.

Station 130 broadcasts frame 136 in the legacy PPDU format of IEEE 802.11p. On this basis, station 132 recognizes that its neighboring station 130 is a legacy station. Station 132 proceeds to broadcast frame 138 in this same legacy PPDU format, followed immediately (after the minimum permitted interval of one SIFS) by frame 140 in an NGV PPDU format. Station 134 receives frame 138, followed immediately by frame 140, and recognizes on this basis that station 132 is NGV-compliant. (Legacy stations, such as station 130, will receive and decode frame 138 and will simply ignore frame 140, because they are unable to decode it.) Assuming station 134 does not detect any legacy stations in its own neighborhood, it may broadcast frame 142 in the NGV PPDU format, without also having to broadcast a legacy frame.

In other embodiments (not shown in the figures), NGV-compliant stations may use other methods to announce their NGV capabilities, for example:

An NGV-compliant station may transmit a frame in a legacy IEEE 802.11p PPDU, with a PHY extension of a certain pattern and length.

An NGV-compliant station may transmit a frame in a legacy IEEE 802.11p PPDU, with the unicast/broadcast bit in the transmitter address field set to "broadcast" (rather than the standard "unicast").

An NGV-compliant station may transmit a frame in a legacy IEEE 802.11p PPDU, with a certain specific initial scramble value, rather than a random value as provided by the standard.

As in the preceding embodiments, legacy stations will ignore the special field values in these frames, while NGV-compliant stations will recognize them as indicating that the station that transmitted the frame has NGV capabilities.

Other methods that can be used to signal NGV capabilities while using frames in a legacy format will be apparent to those skilled in the art after reading the above description. All such alternative methods are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a transceiver configured to transmit and receive signals over a wireless channel in accordance with both a first communication protocol and a second communication protocol, the second communication protocol being backward-compatible with the first communication protocol, the transceiver being configured to provide capabilities that are supported by the second communication protocol but are not supported by the first communication protocol; and
a communication controller, which is configured to generate data frames for transmission by the transceiver to a first wireless station and a second wireless station, the data frames including a respective frame header with a format that is compatible with the first communication protocol while including, in a specified field of the frame headers, a predefined value, wherein the specified field is a duration/ID field in a medium access control (MAC) header and the predefined value of the duration/ID field is used in signaling a duration value of acknowledgement frames to the data frames in terms of slot times, the duration value in the frame headers defining one of a non-integer number of slot times not compatible with the first communication protocol to further indicate that the apparatus is capable of communicating in accordance with the second communication protocol and an integer number of slot times compatible with the first communication protocol to further indicate that the apparatus is capable of communicating in accordance with the first communication protocol, wherein the first wireless station which is arranged to only communicate with the first communication protocol detects that the duration value is the non-integer number of slot times in the frame headers, ignores the duration value and terminates a transmitted acknowledgement frame at the integer slot time; and wherein the second wireless station which is arranged to communicate with the second communication protocol detects that the duration value is the non-integer number of slot times in the frame headers and terminates a transmitted acknowledgement frame at the non-integer number of slot times.

2. The apparatus according to claim 1, wherein the data frames generated by the communication controller that include the predefined value in the specified field of the frame headers comprise broadcast frames, to be received and processed by all of the other stations in a neighborhood of the apparatus.

3. The apparatus according to claim 1, wherein the communication controller is configured to process data frames received by the transceiver from the wireless station, and in response to detecting that the specified field in a received data frame contains the predefined value, to respond to the wireless station by transmitting a data frame in accordance with the second communication protocol.

4. The apparatus according to claim 1, wherein the first communication protocol is an IEEE 802.11p protocol, and the second protocol in an IEEE 802.11bd protocol.

5. The apparatus according to claim 1, wherein the communication controller is configured to process data frames received by the transceiver from multiple wireless stations in a neighborhood of the apparatus, and upon detecting that at least one of the received data frames contains the duration value defining the non-integer number of slot times and at least one of the received data frames contains the duration value defining the integer number of slot times, to responsively transmit further data frames to the multiple wireless stations in the neighborhood of the apparatus in accordance with only the first communication protocol.

6. The apparatus according to claim 1, wherein the communication controller is configured to process data frames received by the transceiver from all wireless stations in a neighborhood of the apparatus and to transmit a broadcast frame in accordance with the second communication protocol to all wireless stations in the neighborhood of the apparatus only in response to all of the data frames received by the transceiver from all wireless stations within a specified time interval prior to transmitting the broadcast frame containing the duration value defining the non-integer number of slot times.

7. A method for communication, comprising:
providing a transceiver that is capable of transmitting and receiving signals over a wireless channel in accordance with both a first communication protocol and a second communication protocol, the second communication protocol being backward-compatible with the first communication protocol, the transceiver having capabilities that are supported by the second communication protocol but are not supported by the first communication protocol; and
signaling the capabilities of the transceiver by transmitting from the transceiver to a wireless station a data frame including a frame header with a format that is compatible with the first communication protocol while including, in a specified field of the frame headers, a predefined value, wherein the specified field is a duration/ID field in a medium access control (MAC) header and the predefined value of the duration/ID field is used in signaling a duration value of acknowledgement frames to the data frames in terms of slot time, the duration value in the frame headers defining one of a non-integer number of slot times not compatible with the first communication protocol to further indicate that the transceiver is capable of communicating in accordance with the second communication protocol and a non-integer number of slot times compatible with the first communication protocol to further indicate that the apparatus is capable of communicating in accordance with the first communication protocol, wherein the first wireless station which is arranged to only communicate with the first communication protocol detects that the duration value is the non-integer number of slot times in the frame headers, ignores the duration value and terminates a transmitted acknowledgement frame at the integer slot time; and wherein the second wireless station which is arranged to communicate with the second communication protocol detects that the duration value is the non-integer number of slot times in the frame headers and terminates a transmitted acknowledgement frame at the non-integer number of slot times.

8. The method according to claim 7, wherein signaling the capabilities comprises inserting the predefined value in the specified field in one or more broadcast frames transmitted by the transceiver.

9. The method according to claim 7, and comprising processing data frames received by the transceiver from flail the wireless station, and in response to detecting that the specified field in a received data frame contains the predefined value, responding to the wireless station by transmitting a data frame in accordance with the second communication protocol.

10. The method according to claim 7, wherein providing the transceiver comprises configuring the transceiver to communicate in accordance with an IEEE 802.11p protocol and an IEEE 802.11bd protocol.

11. The method according to claim 7, further comprising processing data frames received by the transceiver from multiple wireless stations in a neighborhood and upon detecting that at least one of the received data frames contains the duration value defining the integer number of slot times and at least one of the received data frames contains the duration value defining the non-integer number of slot times, to responsively transmit further data frames to the multiple wireless stations in the neighborhood of the apparatus in accordance with only the first communication protocol.

12. The method according to claim 7, further comprising processing data frames received by the transceiver from all wireless stations in a neighborhood and to transmit a broadcast frame in accordance with the second communication protocol to all wireless stations in the neighborhood of the apparatus only in response to all of the data frames received by the transceiver from all wireless stations within a specified time interval prior to transmitting the broadcast frame containing the duration value defining the non-integer number of slot times.

* * * * *